Figure 1:
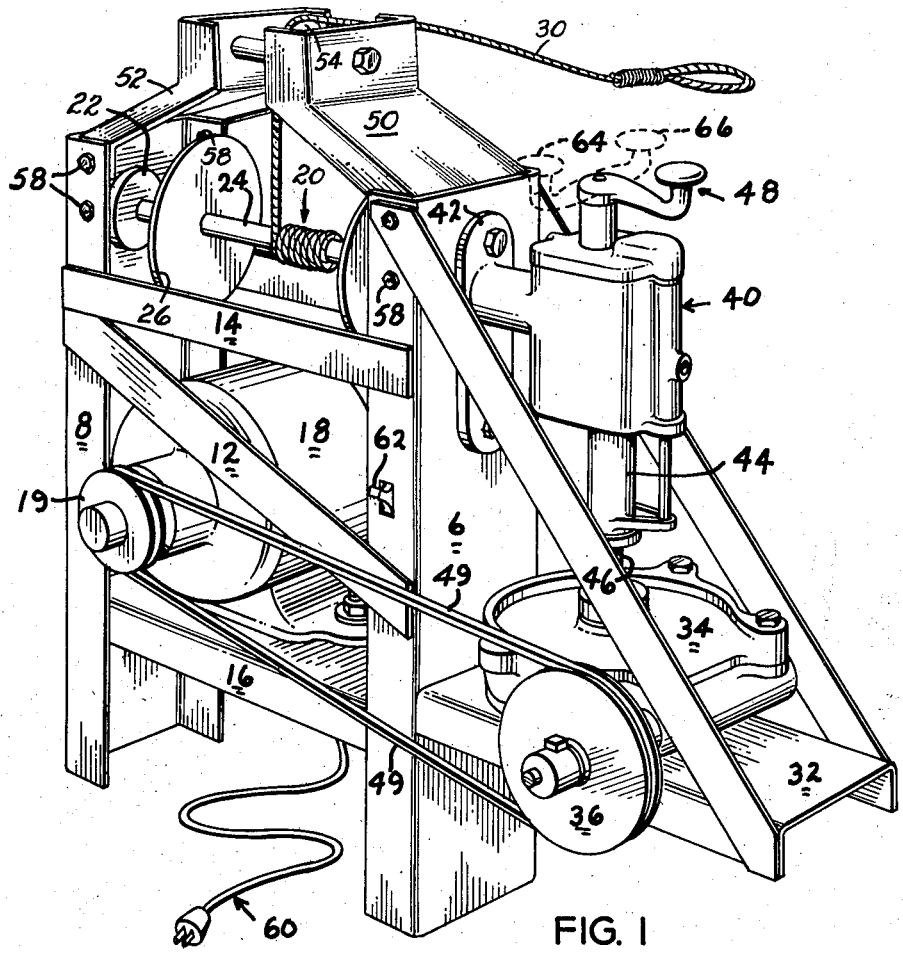

July 28, 1959 E. F. CARPENTER 2,896,911
CABLE PULLER

Filed March 31, 1955 2 Sheets-Sheet 1

Edward F. Carpenter
INVENTOR.

BY Loyd J. Miller
ATTORNEY

July 28, 1959     E. F. CARPENTER     2,896,911
CABLE PULLER

Filed March 31, 1955                                   2 Sheets-Sheet 2

Edward F. Carpenter
INVENTOR.

BY Loyal J. Miller
ATTORNEY

United States Patent Office 2,896,911
Patented July 28, 1959

2,896,911
CABLE PULLER
Edward F. Carpenter, Oklahoma City, Okla.
Application March 31, 1955, Serial No. 498,296
4 Claims. (Cl. 254—134.3)

The present invention relates to the art of installing electric wiring and more particularly to a device for pulling electric cables through conduit.

It is generally recognized in the electrical trade that a large portion of the cost of installing electrical wiring of new building construction results from the number of men needed multiplied by the time element when pulling or threading electric wires or cables through conduit as installed. Many times the wires must be pulled through two or more bends or elbows in the conduit. Some wiring installation jobs requiring a circuit capable of carrying a heavy electrical load often use two inch diameter pipe enclosing four No. 4—0 wires. These wires are of a diameter that when placed side by side within the two inch conduit they nearly fill the bore of the same. Considerable frictional resistance is offered against the wiring being pulled through such an installation and particularly so when one or more bends has been placed in the enclosing conduit. More recently certain cities have approved new building codes for residential areas which require one and one-half inch conduit housing three No. 2 or No. 0 wires. Heretofore one electrician could easily wire a residential dwelling; but when using this heavier wiring and conduit at least two men are needed, thus raising the electrical installation costs considerably.

A device for pulling the wiring through the conduit is therefore highly desirable. One or two such devices have been manufactured but each of them have the common undesirable features of being too bulky and consequently having too great a weight. They are so heavy that one man cannot manually move them about for proper placement and operation. Another objection to these devices is the initial purchase price, which is prohibitive, especially for small job contractors.

The primary object of this invention is to provide a device for pulling electric wiring through a conduit which may be carried and operated by one man.

Another object of this invention is to provide a cable puller of this class which is comparatively light in weight.

Another object of this invention is to provide a cable puller which may be manufactured at a comparatively low cost.

An additional object of this invention is to provide a cable puller of this class which may be operated by the motor of a conventional electric hand drill.

A further object of this invention is to provide a cable puller of this class which is geared for pulling heavy loads at a slow speed.

The present invention accomplishes these and other objects by providing a rigid frame having parallel spaced-apart side members rotatably journaling, at one end of the frame, a reel therebetween. A gear box housing a gear train is rigidly connected to one side of the frame. A clutch carried by the frame operatively connects the gear train to the reel. An electric motor mounted between the side members of the frame is derivably connected to the gear train for rotating the reel.

Figure 2:
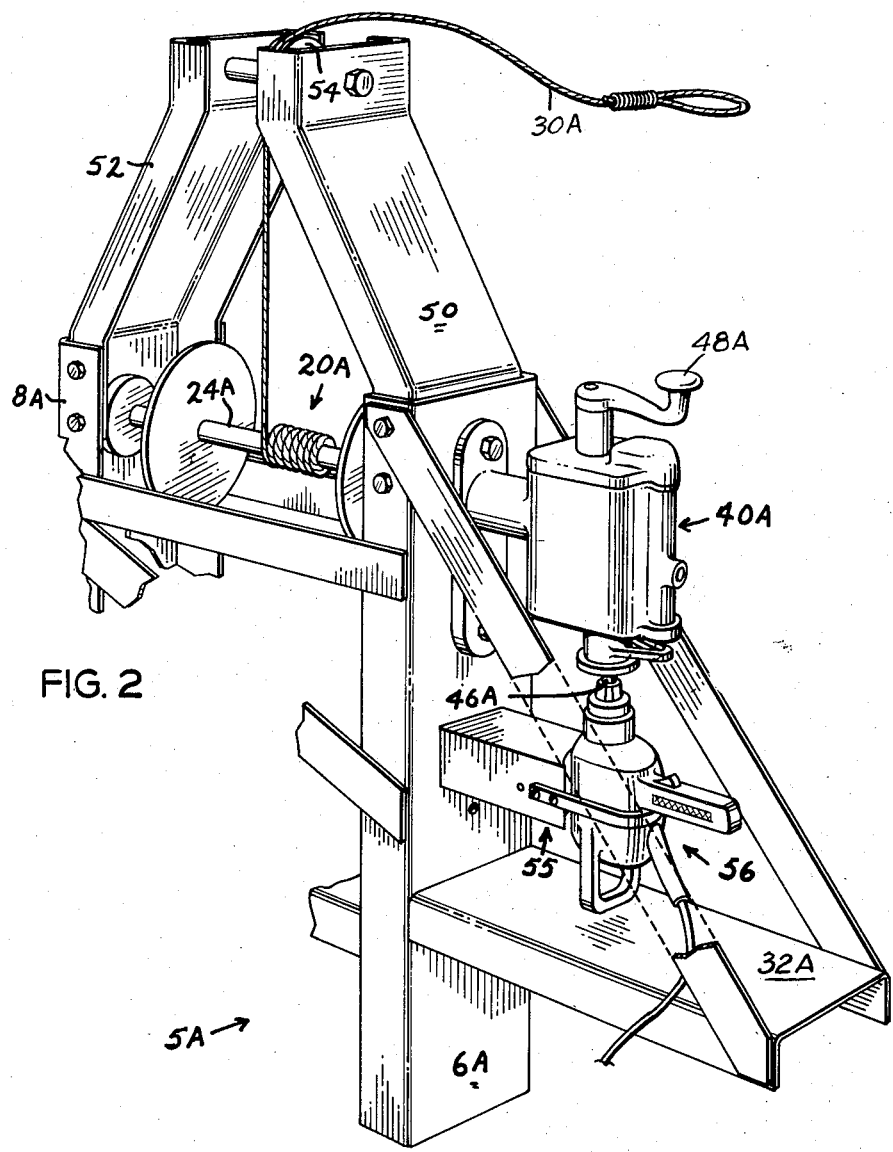

Other objects will be apparent from the following description when taken in conjunction with the accompanying two sheets of drawings, wherein:

Figure 1 is a perspective view of the device; and,
Figure 2 is a fragmentary perspective view, similar to Fig. 1, illustrating an alternate arrangement of parts of the device.

Like characters of reference designate like parts in those figures of the drawings in which they occur.

In the drawings:

Referring more particularly to Figure 1 the reference numeral 5 indicates the device, as a whole, including a pair of parallel vertically disposed channel iron side members 6 and 8. The legs of the channel members are disposed inwardly toward each other. Suitable strap iron bracing 12 and 14 rigidly connected to the members 6 and 8 hold the same in rigid spaced-apart relation. A channel iron cross brace 16 rigidly connected at each end to the side members 6 and 8, respectively, supports an electric motor 18 having a drive pulley 19. A reel 20 is rotatably journaled by suitable bearings 22 carried by the upper end portions, as seen in Figure 1, of the side members 6 and 8. The reel 20 includes a shaft 24 and opposing end disks 26 and 28. A flexible element, such a soft-laid cable 30, of small diameter and a selected length, has one end rigidly connected to the shaft 24 and is wound on the shaft 24 in a conventional manner. A horizontally disposed channel iron support 32 having its legs disposed downwardly is rigidly connected at one end to the side member 6 and projects laterally therefrom a selected distance. A conventional speed reduction gear housing 34 of a comparatively small size, such as has been used by the makers of a popular washing machine, is mounted on the upper surface of the support 32 with a driven pulley 36 projecting laterally of the support 32 in co-operative alignment with the drive pulley 19.

A conventional clutch 40, right angular in general configuration, such as is used for operating the wringer of a washing machine having a control handle 48, is rigidly connected to the side member 6 by the clutch housing 42 and has its driven shaft, not shown, within the housing end 44 connected to the driving shaft 46 of the gear train. The clutch housing 42 houses a driver shaft, not shown, connected to the shaft 24 of the reel 20.

Belting 49 drivably connects the motor drive pulley 19 with the driven pulley 36 of the gear train.

Referring now more particularly to Figure 2 a lighter smaller embodiment 5A is shown which has a rigid frame construction similar to the device shown in Figure 1 but has the added feature of a pair of channel members 50 and 52 connected to the upper or reel end of the members 6A and 8A. The members 50 and 52 converge upwardly, as seen in Figure 2, ending in spaced-apart parallel relation for rotatably journaling a pulley 54 therebetween for the purposes more fully explained hereinbelow. A reel 20A having a flexible element 30A wound thereon is similarly journaled between the members 6A and 8A. A similar clutch 40A is similarly connected to the member 6A and to the shaft 24A of the reel 20A. The lateral channel support 32A may be included in the alternate embodiment 5A, as shown, or omitted if desired in the interest of lightness of weight. Power means for driving the reel 20A in this embodiment is supplied by the use of a conventional electric drill 56 of about the size commonly referred to as "½ inch." The collet of the drill 56 is placed in gripping position around the driven shaft 46A of the clutch 40A. Suitable clamping means 55 rigidly hold the drill 56 adjacent the side member 6A.

The converging members 50 and 52 with the pulley 54 are connected to the reel end of the embodiment 5 shown in Figure 1 by bolts 58 through the ends of the members 6 and 8.

Operation

The device 5 is placed with the reel ends of the members 6 and 8 adjacent a junction box, not shown, to which it is desired to pull wiring through conduit, not shown. The flexible element 30 is threaded through the conduit and fastened in a conventional manner to the end of the wiring, not shown, to be pulled into the conduit. The motor 18 is connected to a source of electric current by the cord 60 in a conventional manner. A switch 62 conveniently placed upon the side member 6 is actuated to start the motor 18. The motor drives the gears enclosed by the housing 34 by the belt 49. The clutch handle 48 as shown in solid lines is in stopped or neutral position. Manually moving the clutch to the dotted line position indicated by the numeral 64 engages the reel 20 for winding the flexible element 30 on the shaft 24 thus pulling the wiring through the conduit. Manually moving the clutch handle 48 to the dotted line position indicated by the numeral 66 reverses the rotation of the reel 20 to allow slack in the element 30 when needed.

The operation of the alternate embodiment 5A is similar to that described hereinabove, except that the converging ends of the members 50 and 52 may be placed adjacent the end of the conduit or an opening in the junction box in position to allow the element 30A to be entrained over the pulley 54 to arrange a more direct or aligned pull on the wiring through the opening. In this embodiment the drill 56 is started and the clutch handle 48A is operated in a similar manner as disclosed for the embodiment 5 to operate the reel 20A.

Obviously the invention is susceptible to some change or alteration without defeating its practicability, and I therefore do not wish to be confined to the preferred embodiment shown in the drawings and described herein, further than I am limited by the scope of the appended claims.

I claim:

1. An electric cable puller, including: a pair of channel iron members rigidly connected in parallel spaced-apart relation forming a frame, said frame having a laterally extending support; a reel journaled between said members in spaced relation with respect to one end of said frame; a flexible element rigidly connected at one end to said reel; outwardly converging channel iron supports rigidly connected to the end of said channel iron members adjacent said reel; a pulley journaled between the converging ends of said outwardly converging supports, the diametric dimension of said pulley being less than the transverse width of each said channel iron support, one common side of said channel iron supports adjacent said pulley being adapted to contact an electrical junction box around the opening therein, whereby said flexible element may be entrained over said pulley in angular relation to the longitudinal axis of said frame; a gear train mounted on said lateral support, said gear train having a driven pulley; a clutch carried by said frame, said clutch connecting said gear train to said reel; and an electric motor having a drive pulley drivably connected to said gear train pulley, whereby said motor driving said gear train coacts with said clutch for winding said flexible element on said reel.

2. An electric cable puller, including: a pair of comparatively short channel iron members arranged in parallel spaced-apart relation; a transverse channel iron support rigidly connected to said members adjacent one end thereof; transverse cross braces rigidly connected to said members adjacent the end opposite said transverse support; a reel journaled between said members in spaced relation with respect to the end opposite said transverse support, said reel having opposing end disks of a size diametrically less than the width of each said channel iron member, one side of the end portion of each of said channel iron members adjacent said reel lying in a plane common to said one side of both said members adapted to co-operatively contact an electrical junction box around the opening therein and hold said reel in spaced relation therewith; a flexible element rigidly connected at one end to said reel; a laterally extending support rigidly carried by one of said members intermediate the ends thereof; a clutch rigidly carried by said one member adjacent said lateral support, said clutch drivably connected to said reel; and an electric motor mounted on one of said supports and drivably connected to said clutch for coacting therewith and rotating said reel, thereby winding said flexible element on said reel.

3. Structure as specified in claim 2, and a pair of outwardly converging channel iron supports rigidly connected to the ends of said members adjacent said reel; and a pulley journaled between the converging ends of said outwardly converging supports, the diametric dimension of said pulley being less than the transverse width of each said channel iron support, one side of the end portion of each channel iron support adjacent said pulley lying in a plane common to said one side of both said supports for contacting an electrical junction box around the opening therein, whereby said flexible element may be entrained over said pulley in angular relation to the longitudinal axis of said members when winding said flexible element on said reel.

4. Structure as specified in claim 2, in which said motor is mounted on said transverse support, said motor having a driving pulley; a gear train mounted on said lateral support and connected with said clutch, said gear train having a driven pulley; and a belt connecting the drive pulley on said motor with the driven pulley on said gear train.

References Cited in the file of this patent

UNITED STATES PATENTS

| | | |
|---|---|---|
| 2,232,457 | Holland | Feb. 18, 1941 |
| 2,596,846 | Feigelson | May 13, 1952 |
| 2,621,870 | Barton | Dec. 16, 1952 |
| 2,650,771 | Marion | Sept. 1, 1953 |
| 2,652,630 | Niland | Sept. 22, 1953 |
| 2,699,919 | Addicks | Jan. 18, 1955 |